(12) United States Patent
Feng et al.

(10) Patent No.: US 9,353,302 B2
(45) Date of Patent: May 31, 2016

(54) FLUORINATED HYDROCARBON COMPOSITION

(75) Inventors: Yinshan Feng, South Windsor, CT (US); Parmesh Verma, Manchester, CT (US)

(73) Assignee: CARRIER CORPORATION, Farmington, CT (US)

( * ) Notice: Subject to any disclaimer, the term of this patent is extended or adjusted under 35 U.S.C. 154(b) by 124 days.

(21) Appl. No.: 13/814,641

(22) PCT Filed: Aug. 11, 2011

(86) PCT No.: PCT/US2011/047482
§ 371 (c)(1),
(2), (4) Date: Feb. 6, 2013

(87) PCT Pub. No.: WO2012/021746
PCT Pub. Date: Feb. 16, 2012

(65) Prior Publication Data
US 2013/0152626 A1  Jun. 20, 2013

Related U.S. Application Data

(60) Provisional application No. 61/373,489, filed on Aug. 13, 2010, provisional application No. 61/416,869, filed on Nov. 24, 2010.

(51) Int. Cl.
C09K 5/04 (2006.01)
F25B 39/00 (2006.01)

(52) U.S. Cl.
CPC ........... *C09K 5/045* (2013.01); *C09K 2205/126* (2013.01); *C09K 2205/22* (2013.01)

(58) Field of Classification Search
CPC .................................. C09K 5/045; F25B 39/00
USPC .......................... 252/67, 68; 62/467, 468, 498
See application file for complete search history.

(56) References Cited

U.S. PATENT DOCUMENTS

| 7,524,805 B2 | 4/2009 | Singh et al. |
| 2006/0243944 A1 | 11/2006 | Minor et al. |
| 2007/0007488 A1 | 1/2007 | Singh et al. |
| 2007/0108403 A1 | 5/2007 | Sievert et al. |
| 2008/0230738 A1 | 9/2008 | Minor et al. |
| 2009/0253820 A1 | 10/2009 | Bowman et al. |
| 2009/0272931 A1 | 11/2009 | Minor et al. |
| 2009/0278075 A1 | 11/2009 | Mahler et al. |
| 2009/0305876 A1 | 12/2009 | Singh et al. |
| 2010/0044619 A1 | 2/2010 | Hulse et al. |
| 2010/0090156 A1 | 4/2010 | Nappa et al. |
| 2010/0186432 A1* | 7/2010 | Perti et al. ...................... 62/115 |
| 2014/0166923 A1 | 6/2014 | Yana Motta et al. |

FOREIGN PATENT DOCUMENTS

CN  101665681 A  3/2010
EP  2149592 A2  2/2010
(Continued)

OTHER PUBLICATIONS

International Search Report for International Application No. PCT/US2011/047482 mailed Oct. 18, 2011, 4 pages.
(Continued)

*Primary Examiner* — Douglas MC Ginty
(74) *Attorney, Agent, or Firm* — Cantor Colburn LLP

(57) ABSTRACT

A composition is described including a first fluorinated hydrocarbon compound according to the formula:

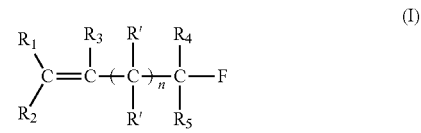

(I)

wherein $R_1$, $R_2$, $R_3$, $R_4$, and $R_5$ are each independently H, F, Cl, Br, or I, n is 0, 1, 2, or 3, and each R' group is independently H, F, Cl, Br, or I, with the proviso that zero to three of $R_1$, $R_2$, $R_3$, $R_4$, and $R_5$ are F;

a second fluorinated hydrocarbon compound according to the formula:

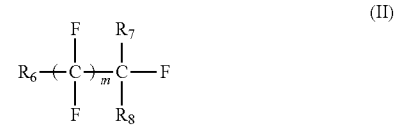

(II)

wherein m is 0 or 1, and $R_6$, $R_7$, and $R_8$ are each independently H, F, Cl, Br, or I, with the proviso that one of $R_6$, $R_7$, and $R_8$ is F; and a third fluorinated hydrocarbon compound according to the formula:

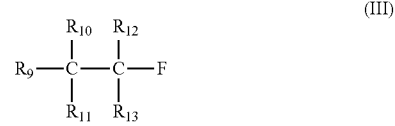

(III)

wherein $R_9$, $R_{10}$, $R_{11}$, $R_{12}$ and $R_{13}$ are each independently H, Cl, Br, or I.

15 Claims, 1 Drawing Sheet

(56) References Cited

FOREIGN PATENT DOCUMENTS

| | | | | |
|---|---|---|---|---|
| GB | 2435747 A | 9/2007 | | |
| GB | WO 2011101617 A2 * | 8/2011 | ............... | C08J 9/146 |
| GB | WO 2011101622 A1 * | 8/2011 | ............... | C09K 3/30 |
| WO | WO2008009922 A2 | 1/2008 | | |
| WO | WO 2008009923 A2 * | 1/2008 | ............... | C09K 5/04 |
| WO | WO2008009928 A2 | 1/2008 | | |
| WO | WO 2008009928 A2 * | 1/2008 | ............... | C09K 5/04 |
| WO | WO2009047535 A2 | 4/2009 | | |
| WO | WO2010064011 A1 | 6/2010 | | |
| WO | 2011101617 A2 | 8/2011 | | |
| WO | 2011101622 A1 | 8/2011 | | |

OTHER PUBLICATIONS

Written Opinion of the International Searching Authority for International Application No. PCT/US2011/047482 mailed Oct. 18, 2011, 5 pages.

First Office Action regarding related CN App. No. 201180039390.8; dated Jan. 5, 2015; 4 pgs.

European Search Report for European Application No. 11 748 846.0-1357 dated Nov. 28, 2013, 5 pages.

* cited by examiner

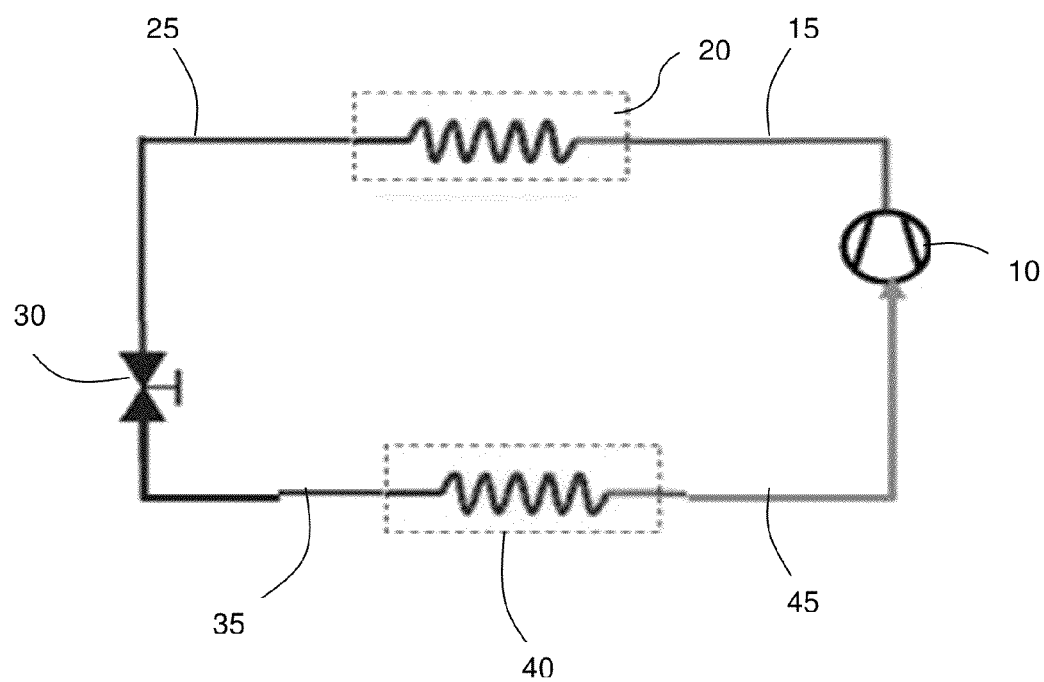

FLUORINATED HYDROCARBON COMPOSITION

CROSS REFERENCE TO RELATED APPLICATIONS

This is a National Phase Application of Patent Application PCT/EP2011/047482 filed on Aug. 11, 2011, which claims priority to U.S. Ser. No. 61/373,489 filed Aug. 13, 2010 and U.S. Ser. No. 61/416,869, all of which are incorporated by reference herein in their entirety.

BACKGROUND OF THE INVENTION

The subject matter disclosed herein generally relates to fluorinated hydrocarbon compositions and their use.

Fluorinated hydrocarbons have been widely used in a number of applications, including refrigerants and other heat transfer fluids, polymer foam blowing agents, fire suppressants, lubricants, fire suppressants, foaming agents, dielectric fluids, solvents, cleaning fluids, drying agents, reaction media, and aerosol propellants, to name a few. In the past chlorinated fluorocarbons (CFC's) were used for many of these applications; however, concerns about their ozone-depleting potential have resulted in their use being largely discontinued. Hydrochlorofluorocarbons (HCFC's) were considered as an alternative for CFC's, but they also have been phased out due to their ozone-depleting potential. CFC's and HCFC's have been largely replaced with hydrofluorocarbons such as HFC-134a (tetrafluoroethane).

New environmental concerns such as global warming have helped spur the quest for new materials to be used for any or all of the above applications. Materials have been proposed, but new and different alternatives are still desired that may offer beneficial performance or properties.

BRIEF DESCRIPTION OF THE INVENTION

According to one aspect of the invention, a composition is provided that includes:
a first fluorinated hydrocarbon compound according to the formula:

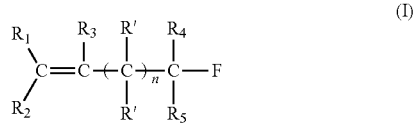

wherein $R_1$, $R_2$, $R_3$, $R_4$, and $R_5$ are each independently H, F, Cl, Br, or I, n is 0, 1, 2, or 3, and each R' group is independently H, F, Cl, Br, or I, with the proviso that zero to three of $R_1$, $R_2$, $R_3$, $R_4$, and $R_5$ are F;

a second fluorinated hydrocarbon compound according to the formula:

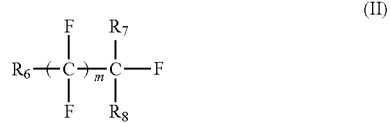

wherein m is 0 or 1, and $R_6$, $R_7$, and $R_8$ are each independently H, F, Cl, Br, or I, with the proviso that at least one of $R_6$, $R_7$, and $R_8$ is F; and a third fluorinated hydrocarbon compound according to the formula:

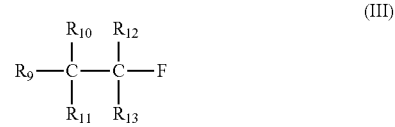

wherein $R_9$, $R_{10}$, $R_{11}$, $R_{12}$ and $R_{13}$ are each independently H, Cl, Br, or I.

According to another aspect of the invention, a heat transfer system is provided that includes a heat transfer fluid circulation loop with evaporation and condensation stages, in which the heat transfer fluid includes the above-described fluorinated hydrocarbon composition.

The compositions described herein can be used in a variety of applications, including but not limited to refrigerants and other heat transfer fluids, polymer foam blowing agents, fire suppressants, lubricants, fire suppressants, foaming agents, dielectric fluids, solvents, cleaning fluids, drying agents, reaction media, and aerosol propellants.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a block diagram depicting a heat transfer system that includes a heat transfer fluid circulation loop with evaporation and condensation stages.

DETAILED DESCRIPTION OF THE INVENTION

The first fluorinated hydrocarbon compound used in the composition described herein is a compound according to the formula:

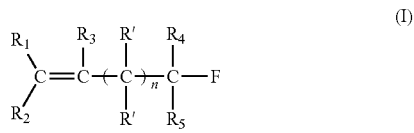

wherein $R_1$, $R_2$, $R_3$, $R_4$, and $R_5$ are each independently H, F, Cl, Br, or I, n is 0, 1, 2, or 3, and each R' group is independently H, F, Cl, Br, or I, with the proviso that zero to three of $R_1$, $R_2$, $R_3$, $R_4$, and $R_5$ are F.

The compounds of formula (I) may include propenes substituted with one to four fluorine atoms, butenes substituted with one to six fluorine atoms, pentenes substituted with one to eight fluorine atoms, and hexenes substituted with one to ten fluorine atoms. As set forth in formula (I), certain other substituents may be present on the compound of formula (I), and the term "hydrocarbon" as used herein throughout is intended to include hydrocarbons that are substituted in accordance with any of the formulas described herein. In one exemplary embodiment, two or three of $R_1$, $R_2$, $R_3$, $R_4$, and $R_5$ are F, so that the compound of formula (I) includes propenes substituted with three to four fluorine atoms, butenes substituted with three to six fluorine atoms, pentenes substituted with three to eight fluorine atoms, and hexenes substituted with three to ten fluorine atoms. In another exemplary embodiment there is no Br present in the compound or, if there is Br present, then there are no hydrogen atoms present in the compound. In yet another exemplary embodiment $R_1$, $R_2$, $R_3$, $R_4$, and $R_5$, and each R' are each independently selected from H or F. In a further exemplary embodiment, n is 0 or 1. In a still further exemplary embodiment, n is 1. Some exemplary compounds may include tetrafluorobutenes in various isomer forms (HFO-1354), pentafluorobutenes in isomer forms consistent with formula (I) (HFO-1345), trifluoropentenes in various isomer forms, hexafluoropentenes in various isomer forms consistent with formula (I), and tetrafluorohexenes in various isomer forms, as well as other known compounds within the scope of formula (I).

In further exemplary embodiments, n is 0, and the compound according to formula (I) is a fluorinated propene that may be further substituted as specified in formula (I). In one exemplary embodiment, n is 0, and zero or one of $R_1$, $R_2$, $R_3$, $R_4$, and $R_5$ are F. Exemplary compounds of such formula (I) compounds may include 3-fluoropropene, 3,3-difluoropropene, 1,3-difluoropropene, or 2,3-difluoropropene. In another exemplary embodiment, n is 0, and two or three of $R_1$, $R_2$, $R_3$, $R_4$, and $R_5$ are F, with the compound of formula (I) including tetrafluoropropenes or trifluoropropenes. In a further exemplary embodiment, n is 0 and three of $R_1$, $R_2$, $R_3$, $R_4$, and $R_5$ are F, with the compound of formula (I) including tetrafluoropropenes. Exemplary tetrafluoropropenes include 2,3,3,3-tetrafluoropropene where $R_1$ and $R_2$ are each H and $R_3$, $R_4$, and $R_5$ in Formula (I) are each F (also referred to as HFO-1234yf, HFC-1234yf or R-1234yf), cis-1,3,3,3-tetrafluoropropene amd/or trans-1,3,3,3-tetrafluoropropene where $R_1$ and $R_3$ are each H and $R_2$, $R_4$, and $R_5$, in Formula (I) are each F (the cis- and trans-forms of 1,3,3,3-tetrafluoropropene and mixtures thereof are referred to as HFO-1234ze, HFC-1234ze, or R-1234ze), and cis- and/or trans-1,2,3,3-tetrafluoropropene where $R_1$ and $R_4$ are each H and $R_2$, $R_3$, and $R_5$ in Formula (I) are each F (also referred to as HFO-1234ye, HFC-1234ye, or R-1234ye). In another further exemplary embodiment, n is 0 and two of $R_1$, $R_2$, $R_3$, $R_4$, and $R_5$ are F, with the compound of formula (I) including trifluoropropenes. Exemplary trifluoropropenes include 3,3,3-trifluoropropene where $R_4$ and $R_5$ are each F and $R_1$, $R_2$, and $R_3$ in Formula (I) are each H (also referred to as HFO-1243zf, HFC-1243zf, or R-1243zf), 2,3,3-trifluoropropene where $R_3$ and $R_4$ are each F and $R_1$, $R_2$, and $R_5$ in Formula (I) are each H (also referred to as HFO-1243yf, HFC-1243yf, or R-1243yf), and cis- and/or trans-1,3,3-trifluoropropene where $R_1$ and $R_4$ are each F and $R_2$, $R_3$, and $R_5$ in Formula (I) are each H (also referred to as HFO-1243ze, HFC-1243ze, or R-1243ze), cis- and/or trans-1,2,3-trifluoropropene where $R_1$ and $R_3$ are each F and $R_2$, $R_4$, and $R_5$ in Formula (I) are each H (also referred to as HFO-1243ye, HFC-1243ye, or R-1243ye). One or more compounds according to formula (I) may also be used in combination. In one exemplary embodiment, the compound of formula (I) is a tetrafluoropropene. In another, exemplary embodiment, the compound of formula (I) is HFC-1234yf, HFC-1234ze, or a mixture of the two. In another, more specific, exemplary embodiment, the compound of formula (I) is HFC-1234yf. In yet another, more specific, exemplary embodiment, the compound of formula (I) is HFC-1243zf.

The second fluorinated hydrocarbon compound used in the composition described herein is a compound according to the formula:

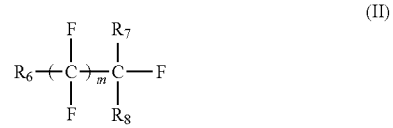

wherein m is 0 or 1, and $R_6$, $R_7$, and $R_8$ are each independently H, F, Cl, Br, or I, with the proviso that at least one of $R_6$, $R_7$, and $R_8$ is F.

In one exemplary embodiment $R_6$, $R_7$, and $R_8$ are each independently selected from H or F. In another exemplary embodiment, one of $R_6$, $R_7$, and $R_8$ is H and the other two of $R_6$, $R_7$, and $R_8$ are F. The compounds of formula (II) include, where m=0, difluoromethanes (including substituted difluoromethanes within the scope of formula (II) such as chlorodifluoromethane, bromodifluoromethane, and iododifluoromethane), trifluoromethane (including substituted trifluoromethane such as chlorotrifluoromethane), or tetrafluoromethane. Difluoromethanes is also known as HFC-32 or R-32, trifluoromethane is also known as HFC-23 or R-23. Tetrafluoromethane is also known as R-14). In one exemplary embodiment, the compound of formula (II) is HFC-32. The compounds of formula (II) include, where m=1, tetrafluoroethanes (including substituted tetrafluoroethanes within the scope of formula (II) such as chlorotetrafluoroethane, bromotetrafluoroethane, and iodotetrafluoroethane), pentafluoroethane (including substituted pentafluoroethane such as chloropentafluoroethane), or hexafluoroethane. Examples of tetrafluoroethanes are 1,1,1,2-tetrafluoroethane (also known as HFC-134a or R-134a) and 1,1,2,2-tetrafluoroethane (also known as HFC-134 or R-134). In one exemplary embodiment, the compound of formula (II) is HFC-134a. In another exemplary embodiment, the compound of formula (II) is HFC-134. Combinations of multiple compounds according to formula (II) may also be used. Combinations of multiple compounds according to formula (II) may also be used.

The third fluorinated hydrocarbon of the formula:

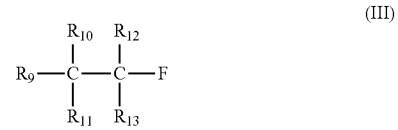

wherein $R_9$, $R_{10}$, $R_{11}$, $R_{12}$ and $R_{13}$ are each independently H, Cl, Br, or I.

The compounds of formula (III) include fluoroethane (also known as HFC-161 or R-161) as well as substituted fluoroethanes (e.g., 1-chloro-2-fluoroethane) within the scope of formula (III).

The compounds described above are known materials and are listed in the Chemical Abstracts, which includes references to articles and patents that describe how they can be synthesized. Many of the compounds are commercially available. Some of these compounds are widely commercially available, including but not limited to HFC-161, HFC-32, and HFC-1234yf. One of ordinary skill in the art would thus readily be able to obtain or to synthesize the fluorinated hydrocarbon compounds described herein.

The relative amounts of the first, second, and third fluorinated hydrocarbon compounds in the composition described herein may vary widely depending on factors such as the application for which the composition will be used. In one exemplary embodiment targeting Class 2 or 2L flammability, the composition includes one or more compound(s) of formula (I) in an amount between 1 and 98 percent by weight, one or more compound(s) of formula (II) in an amount between 1 and 98 percent by weight, and from 1 to 56 weight percent of the third compound, in each case based on the total weight of the three types of fluorinated hydrocarbon compounds. In another exemplary embodiment targeting Class 2L flammability with GWP<400, the composition includes one or more compound(s) of formula (I) in an amount between 1 and 98 percent by weight, one or more compound(s) of formula (II) in an amount between 1 and 58 percent by weight, and from 1 to 56 weight percent of the third compound, in each case based on the total weight of the three types of fluorinated hydrocarbon compounds.

The compositions described herein can provide low GWP factors. A description of GWP and values for GWP of known chemicals may be found by reference to materials promulgated by the Intergovernmental Panel on Climate Change (IPCC) (or alternatively ASHRAE standard 34). In some exemplary embodiments, the compositions provide a GWP of less than 1000. In other exemplary embodiments, the compositions provide a GWP of less than 400. In still other exemplary embodiments, the compositions provide a GWP of less than 150. The compositions also provide acceptable flammability, generally achieving a 2 or 2L class rating.

In some exemplary embodiments, the fluorinated hydrocarbon composition is used as a heat transfer fluid. In further exemplary embodiments, the heat transfer fluid is used in a heat transfer fluid circulation loop that includes evaporation and condensation stages. Examples of such systems are well-known, including but not limited to air conditioning systems, heat pumps, refrigerators, chillers, ORC (Organic Rankine Cycle) systems, cryogenic systems, and the like. An exemplary heat transfer system with a heat transfer fluid circulation loop is shown in block diagram form in FIG. 1. As shown in FIG. 1, a compressor 10 pressurizes heat transfer fluid in its gaseous state, which both heats the fluid and provides pressure to circulate it throughout the system. The hot pressurized gaseous heat transfer fluid exiting from the compressor 10 flows through conduit 15 to condenser 20, which functions as a heat exchanger to transfer heat from the heat transfer fluid to the surrounding environment, resulting in condensation of the hot gaseous heat transfer fluid to a pressurized moderate temperature liquid. The liquid heat transfer fluid exiting from the condenser 20 flows through conduit 25 to expansion valve 30, where the pressure is reduced. The reduced pressure liquid heat transfer fluid exiting the expansion valve 30 flows through conduit 35 to evaporator 40, which functions as a heat exchanger to absorb heat from the surrounding environment and boil the heat transfer fluid. Gaseous heat transfer fluid exiting the evaporator 40 flows through conduit 45 to the compressor 10, thus completing the heat transfer fluid loop. The heat transfer system has the effect of transferring heat from the environment surrounding the evaporator 40 to the environment surrounding the condenser 20. The thermodynamic properties of the heat transfer fluid must allow it to reach a high enough temperature when compressed so that it is greater than the environment surrounding the condenser 20, allowing heat to be transferred to the surrounding environment. The thermodynamic properties of the heat transfer fluid must also have a boiling point at its post-expansion pressure that allows the temperature surrounding the evaporator 40 to provide heat to vaporize the liquid heat transfer fluid.

One measure of effectiveness of a heat transfer fluid in a circulation loop that includes vaporization and condensation stages is the difference in temperature between the vapor state and the liquid state that occurs in an evaporator or condenser operating at constant pressure, also know as the glide or temperature glide. In some exemplary embodiments, the compositions described herein can provide a glide of less than 7° C. In other exemplary embodiments, the compositions described herein can provide a glide of less than 3° C. In still other exemplary embodiments, the compositions described herein can provide a glide of less than 1° C. Some exemplary embodiments of the invention may therefore be able to provide a combination of GWP and glide values that suit them for use as heat transfer fluids in a heat transfer system circulation loop that includes vaporization and condensation stages.

In certain exemplary embodiments where the fluorinated hydrocarbon composition is used as a heat transfer fluid in a heat transfer system circulation loop that includes vaporization and condensation stages, the composition may be an azeotropic or near-azeotropic mixture. In an azeotropic mixture, the composition of the vapor and liquid phases at equilibrium are identical. In a near azeotropic mixture, the composition of the vapor and liquid phases at equilibrium are substantially identical. Azeotropic or near azeotropic mixtures may be beneficial for such heat transfer applications because they allow the system to maintain a relatively constant temperature in the evaporator and condenser stages of the system. In some exemplary embodiments, azeotropic or near azeotropic mixtures include one or more compound(s) of formula (I) in an amount between 1 and 98 percent by weight, one or more compound(s) of formula (II) in an amount between 1 and 80 percent by weight, and from 1 to 25 weight percent of the third compound, in each case based on the total weight of the three types of fluorinated hydrocarbon compounds. In a non-azeotropic mixture, the composition of the vapor and liquid phases at equilibrium has substantial differences. Non-azeotropic mixtures may still reach similar thermal performance of the azeotropic or near-azeotropic mixtures in a properly designed heat transfer system. In some exemplary embodiments, non-azeotropic mixtures include one or more compound(s) of formula (I) in an amount between 1 and 98 percent by weight, one or more compound(s) of formula (II) in an amount between 1 and 80 percent by weight, and from 1 to 56 weight percent of the third compound, in each case based on the total weight of the three types of fluorinated hydrocarbon compounds.

The compositions of the present invention may include other components for the purpose of enhancing or providing certain functionality to the composition, or in some cases to reduce the cost of the composition. For example, refrigerant or other heat transfer fluid compositions may include a lubricant to provide lubrication to components such as the compressor, as is well-known in the art. Among these lubricants are those conventionally used in compression refrigeration apparatus utilizing chlorofluorocarbon refrigerants. Such lubricants and their properties are discussed in the 1990 ASHRAE Handbook, Refrigeration Systems and Applications, chapter 8, titled "Lubricants in Refrigeration Systems", pages 8.1 through 8.21. In an exemplary embodiment, the lubricants may comprise those commonly known as "mineral oils" in the field of compression refrigeration lubrication. Mineral oils may include paraffins (i.e. straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). In other exemplary embodiments, lubricants may include those commonly known as "synthetic oils" in the field of compression refrigeration lubrication. Synthetic oils may include alkylaryls (i.e. linear and branched alkyl alkylbenzenes), synthetic paraffins and napthenes, and poly(alphaolefins). Representative conventional lubricants include, but are not limited to, the commercially available BVM 100 N (paraffinic mineral oil sold by BVA Oils), Suniso® 3GS and Suniso® 5GS (naphthenic mineral oil sold by Crompton Co.), Sontex® 372LT (naphthenic mineral oil sold by Pennzoil), Calumet® RO-30 (naphthenic mineral oil sold by Calumet Lubricants), Zerol® 75, Zerol® 150 and Zerol® 500 (linear alkylbenzenes sold by Shrieve Chemicals) and HAB 22 (branched alkylbenzene sold by Nippon Oil).

Lubricants may further include those that have been designed for use with hydrofluorocarbon refrigerants and are miscible with refrigerants of the present invention under compression refrigeration, air-conditioning, or heat pump apparatus' operating conditions. Such lubricants and their properties are discussed in "Synthetic Lubricants and High-Performance Fluids", R. L. Shubkin, editor, Marcel Dekker, 1993. Such lubricants include, but are not limited to, polyol esters (POEs) such as Castrol® 100 (Castrol, United Kingdom), polyalkylene glycols (PAGs) such as RL-488A from Dow (Dow Chemical, Midland, Mich.), and polyvinyl ethers (PVEs). These lubricants are readily available from various commercial sources. Lubricants may be selected by considering a given compressor's requirements and the environment to which the lubricant will be exposed. Lubricants may have a kinematic viscosity of at least about 5 cs at 40° C.

Commonly used refrigeration system additives may optionally be added, as desired, to compositions of the present invention in order to enhance lubricity and system stability. These additives are generally known within the field of refrigeration compressor lubrication, and include lubricant compatibilizers, anti wear agents, extreme pressure lubricants, corrosion and oxidation inhibitors, metal surface deactivators, free radical scavengers, foaming and antifoam control agents, leak detectants (e.g., UV-sensitive dyes), and the like. In general, these additives are present only in small amounts relative to the overall composition. They are typically used at concentrations of from less than about 0.1% to as much as about 3% of each additive. These additives are selected on the basis of the individual system requirements Some typical examples of such additives may include, but are not limited to, lubrication enhancing additives, such as alkyl or aryl esters of phosphoric acid and of thiophosphates. Additionally, the metal dialkyl dithiophosphates (e.g. zinc dialkyl dithiophosphate or ZDDP, Lubrizol 1375) and other members of this family of chemicals may be used in compositions of the present invention. Other antiwear additives include natural product oils and assymetrical polyhydroxyl lubrication additives such as Synergol TMS (International Lubricants). Similarly, stabilizers such as anti oxidants, free radical scavengers, and water scavengers may be employed. Compounds in this category can include, but are not limited to, butylated hydroxy toluene (BHT) and epoxides.

As mentioned above, in certain exemplary embodiments, the fluorinated hydrocarbon composition is used as a heat transfer fluid in a heat transfer system involving evaporation and condensation, also referred to as vapor-compression heat transfer. A vapor-compression cycle re-uses heat transfer fluid in multiple steps producing a cooling effect in one step and a heating effect in a different step. The cycle can be described simply as follows. Liquid heat transfer fluid enters an evaporator through an expansion device, and the liquid heat transfer fluid boils in the evaporator at a low temperature to form a gas and produce cooling in a first environment. The low-pressure gas enters a compressor where the gas is compressed to raise its pressure and temperature. The higher-pressure (compressed) gaseous heat transfer fluid then enters the condenser in which the refrigerant condenses and discharges its heat to a second environment. The heat transfer fluid then returns to the expansion device through which the liquid expands from the higher-pressure level in the condenser to the low-pressure level in the evaporator, thus repeating the cycle.

In other exemplary embodiments, the fluorinated hydrocarbon composition may be used as a heat transfer fluid in a system that does not require the use evaporation and compression. Such systems may be used to transfer heat to or from a vapor-compression heat transfer system where the vapor-compression system may not be in physical proximity to an environmental heat source (e.g., in a heat pump system) or an environmental heat sink (e.g., in a refrigeration or air conditioning system), or in a variety of heat exchange systems such as used in industrial/chemical processes. In such systems, the fluorinated hydrocarbon composition may be circulated between a heat exchanger in a higher-temperature environment and a heat exchanger in a lower-temperature environment. The fluorinated hydrocarbon composition will absorb heat in the heat exchanger in the higher-temperature environment, thus raising the temperature of the composition, and will give off heat in the heat exchanger in the lower-temperature environment, thus lowering the temperature of the composition. From there, the composition will return to the heat exchanger in the higher-temperature environment, thus repeating the cycle.

In exemplary embodiments of the invention, the fluorinated hydrocarbon compositions described herein may be used as a blowing agent in the preparation of a polymer foam such as a polyurethane, polystyrene, or polyolefin foam. In such applications, the fluorinated hydrocarbon composition may be used by itself or in combination with one or more surfactants, cell opening agents, co-blowing agents (e.g., a chemical or physical blowing agent to work in conjunction with the fluorinated hydrocarbon physical blowing agent), fillers, flame suppressants, stabilizers, and other known polymer foam additives, as is known in the art.

In exemplary embodiments of the invention, the fluorinated hydrocarbon compositions described herein may be used as a propellant, such as an aerosol propellant. In such applications, the aerosol composition may include the fluorinated hydrocarbon propellant along with a liquid or slurry composition to be applied in aerosol fashion, including but not limited to deodorants, perfumes, hair sprays, cleaning solvents, lubricants, and medicinal materials. The aerosol composition may be maintained under pressure with the fluorinated hydrocarbon composition in liquid form, with propellant force resulting from expansion of the fluorinated hydrocarbon composition to vapor form through a spray nozzle.

In other exemplary embodiments, the fluorinated hydrocarbon composition disclosed herein may be used as flame suppressants, cleaning agents, drying agents, or other applications for which fluorinated, chlorinated, of chlorofluorinated hydrocarbons are known to be used. As a flame suppressant, the composition may be mixed with other, more flammable, miscible materials to reduce their flammability. Alternatively, the composition may be poured or sprayed onto a flame, or the flame immersed in the composition, in order to effectuate flame suppression. As a cleaning agent, the composition may be applied to an article to be cleaned or the article may be sprayed or the article otherwise applied with the composition, optionally with manual cleaning techniques such as scrubbing, followed by drying by absorption or evaporation in order to effectuate cleaning. Included in the context of cleaning are embodiments where the composition is used to remove uncured photoresist as part of an etching process. In exemplary embodiments as a drying agent, the fluorinated hydrocarbon composition may be applied to a water-containing medium in order to physically displace water contained therein, followed by removal of the fluorinated hydrocarbon composition by evaporation or adsorption.

EXAMPLES

Fluorinated hydrocarbon compositions were prepared by mixing HFO-1234yf or HFO-1234ze, HFC-32, and HFC-161 in the relative amounts set forth in Table 1 below. Flammability was measured according to ASHRAE Standard 34. GWP was determined according to averaging IPCC GWP values for the individual components according to their mass average in the blend. Glide was calculated using NIST REFPROP software. TEWI was estimated according to the charge amount and energy usage of a 3 Ton heat pump system. Heating and cooling efficiency was simulated in an optimized 3 Ton residential heat pump system, and compared to efficiency and capacity in an identical system operating with HFC-410A as heat transfer fluid. The results are as set forth below in Table 1:

TABLE 1

| Composition | 72% R1234yf 11% R134a 17% R161 | 74% R1234ze 11% R134a 15% R161 | 29% R1234yf/ 59% R32/ 12% R161 |
|---|---|---|---|
| Flammability | 2L | 2L | 2L |
| GWP | 148 | 149 | 401 |
| TEWI from charge (kg $CO_2$) | 370 | 433 | 927 |
| TEWI Total (ratio) | 0.9 | 0.9 | 0.9 |
| Glide (° C.) | 0.7 | 3 | 1.2 |
| Heating and Cooling Efficiency | within ± 5% | within ± 5% | within ± 5% |

The results showed that the compositions provided low GWP, glide, and TWI, while maintaining a level of cooling and heating efficiencies and heating capacity that were very close to the HFC-410A reference.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fluorinated hydrocarbon composition, consisting essentially of:

a first fluorinated hydrocarbon compound according to the formula:

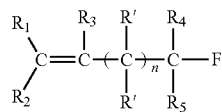

wherein $R_1$, $R_2$, $R_3$, $R_4$, and $R_5$ are each independently H, F, Cl, Br, or I, n is 0, 1, 2, or 3, and each R' group is independently H, F, Cl, Br, or I, with the proviso that three of $R_1$, $R_2$, $R_3$, $R_4$, and $R_5$ are F;

a second fluorinated hydrocarbon compound according to the formula:

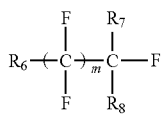

wherein m is 0 or 1, and $R_6$, $R_7$, and $R_8$ are each independently H, F, Cl, Br, or I, with the proviso that at least one of $R_6$, $R_7$, and $R_8$ is F; and a third fluorinated hydrocarbon compound according to the formula:

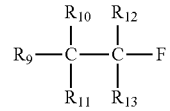

wherein $R_9$, $R_{10}$, $R_{11}$, $R_{12}$ and $R_{13}$ are each independently H, Cl, Br, or I.

2. The composition of claim 1, wherein n is 0, $R_1$ and $R_2$ are each H, and $R_3$, $R_4$, and $R_5$ are each F.

3. The composition of claim 1, wherein n is 0, $R_1$ and $R_3$ are each H, and $R_2$, $R_4$, and $R_5$ are each F.

4. The composition of claim 1, wherein n is 0, $R_1$ and $R_4$ are each H, and $R_2$, $R_3$, and $R_5$ are each F.

5. A fluorinated hydrocarbon composition, consisting essentially of:

a first fluorinated hydrocarbon compound according to the formula:

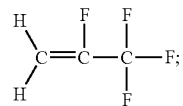

a second fluorinated hydrocarbon compound according to the formula:

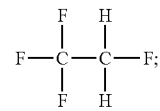

and a third fluorinated hydrocarbon compound according to the formula:

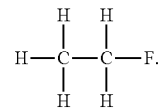

6. The composition of claim 1, wherein $R_6$ and $R_7$ are each F, and $R_8$ is H.

7. The composition of claim 1, wherein $R_6$ and $R_8$ are each F, and $R_7$ is H.

8. The composition of claim 1, wherein m is 0.

9. The composition of claim 1, wherein m is 1.

10. The composition of claim 1, wherein $R_9$, $R_{10}$, $R_{11}$, $R_{12}$ and $R_{13}$ are each H.

11. The composition of claim 1, wherein the first fluorinated hydrocarbon is present in an amount of from 1 to 98 percent by weight, the second fluorinated hydrocarbon is present in an amount of from 1 to 98 percent by weight, and the third fluorinated hydrocarbon is present in an amount of from 1 to 56 percent by weight.

12. The composition of claim 1, further consisting essentially of a compressor lubricant.

13. A heat transfer system that includes a heat transfer fluid circulation loop with evaporation and condensation stages, wherein the heat transfer fluid consists essentially of a fluorinated hydrocarbon composition according to claim 1.

14. The composition of claim 9, wherein $R_6$ is F, and $R_7$ and $R_8$ are each H.

15. The composition of claim 1, having an ASHRAE flammability rating of 2L.

\* \* \* \* \*